United States Patent [19]

Salisbury et al.

[11] Patent Number: 5,678,631
[45] Date of Patent: Oct. 21, 1997

[54] PROCESS FOR REMOVING SOLIDS FROM A WELL DRILLING SYSTEM

[75] Inventors: Darrell P. Salisbury, Sugar Land; Robert L. Sloan, Katy, both of Tex.

[73] Assignee: Well-Flow Technologies, Inc., Houston, Tex.

[21] Appl. No.: 476,608

[22] Filed: Jun. 7, 1995

Related U.S. Application Data

[63] Continuation-in-part of Ser. No. 270,006, Jul. 1, 1994, abandoned.

[51] Int. Cl.$^6$ .............................. E21B 37/00; E21B 37/06
[52] U.S. Cl. ...................... 166/304; 166/312; 507/246; 507/263; 507/265; 507/928; 507/929; 507/931
[58] Field of Search ........................ 166/304, 311, 166/312; 507/203, 246, 261, 263, 265, 266, 267, 927, 928, 929, 931; 134/8, 22.14, 22.19, 26

[56] References Cited

U.S. PATENT DOCUMENTS

| | | |
|---|---|---|
| 3,601,194 | 8/1971 | Gallus . |
| 3,668,129 | 6/1972 | Willett . |
| 4,005,753 | 2/1977 | Scheffel et al. . |
| 4,065,260 | 12/1977 | Quinlan . |
| 4,101,425 | 7/1978 | Young et al. . |
| 4,120,654 | 10/1978 | Quinlan et al. ...................... 507/246 X |
| 4,192,753 | 3/1980 | Pye et al. . |
| 4,453,598 | 6/1984 | Singer et al. . |
| 4,456,537 | 6/1984 | Oliver, Jr. et al. . |
| 4,474,240 | 10/1984 | Oliver, Jr. et al. . |
| 4,475,594 | 10/1984 | Drake et al. . |
| 4,515,699 | 5/1985 | Oliver, Jr. et al. . |
| 4,528,102 | 7/1985 | Oliver, Jr. et al. . |
| 4,588,031 | 5/1986 | Oliver, Jr. et al. . |
| 4,588,445 | 5/1986 | Oliver, Jr. et al. . |
| 4,592,425 | 6/1986 | Oliver, Jr. et al. . |
| 4,728,444 | 3/1988 | Clapper et al. . |
| 4,735,732 | 4/1988 | Clapper et al. . |
| 4,775,489 | 10/1988 | Watkins et al. ...................... 166/304 X |
| 4,828,724 | 5/1989 | Davidson . |
| 5,104,556 | 4/1992 | Yazoi . |
| 5,152,907 | 10/1992 | Dulaney et al. . |
| 5,464,477 | 11/1995 | Awad ...................... 134/26 X |

FOREIGN PATENT DOCUMENTS 0 103 779   3/1984   European Pat. Off. .

*Primary Examiner*—George A. Suchfield
*Attorney, Agent, or Firm*—Fish & Richardson P.C.

[57] ABSTRACT

A process for cleaning a well system and equipment has been developed using a chemical additive that includes an alkene alcohol, preferably a terpene, and either an ether amine or base fluid or combination of the two. The additive can be used in an aqueous or salt solution. The process includes circulating the chemical additive in the well system with spacer fluids.

51 Claims, No Drawings

PROCESS FOR REMOVING SOLIDS FROM A WELL DRILLING SYSTEM

RELATED APPLICATIONS

This application is a continuation-in-part of Ser. No. 08/270,006 filed Jul. 1, 1994, now abandoned, by Darrell P. Salisbury, et al, which is wholly incorporated by reference herein. A related application Ser. No. 08/484,821, is being filed contemporaneously with this application entitled "Chemical Additive for Removing Solids From a Well Drilling System."

FIELD OF THE INVENTION

The present invention relates to the field of completion fluids, and particularly, to a chemical additive and process for removing sludge paraffin and solids from a wellbore and well drilling equipment.

BACKGROUND OF THE INVENTION

The completion phase of oil and gas wells requires the use of solids-free completion and/or packer fluids. If solids are present in the fluid, they can cause serious damage to a producing formation by plugging the pore spaces or the perforations and channels provided to produce fluid flow between the formation and the wellbore. Solids in a packer fluid will eventually precipitate on a packer, making it difficult to connect or disconnect tubing from the packer, thus resulting in a costly well workover. In order to maintain a solids-free fluid, the surface equipment, wellbore, casing, and the like, must be cleaned prior to introduction of the solids-free packer or completion fluid to the wellbore.

Environmental regulations governing the disposal of oil and gas well drilling fluids have become increasingly restrictive. Such regulations have curtailed the use of conventional oil base muds ("OBMs"), which are based on petroleum products such as diesel or mineral oils, and have lead to the development of synthetic base muds ("SBMs"). Synthetic base muds are safer to the health of workers and to the environment. SBMs are more biodegradable and more dispersible in seawater or brine, than traditional oil base muds, however, they are more difficult to remove from the metal surfaces of drilling equipment.

Certain solvent blends have been developed in an effort to remove SBMs during fluid displacement and well clean up processes. However, the residual contaminants are difficult to remove due to any entrained solids or metal surfaces being coated with a film of a "sticky" synthetic base fluid. In some wells solids build up on the casing. Paraffin solids in some cases contributes to this solid build-up and can be difficult to remove.

It has been a practice to mechanically clean mud systems of residual drilling mud by various washing and manual cleanup techniques. Mechanical cleaning, however, is not possible with respect to all of the drilling equipment. Although the use of well drilling tools can increase the amount of solids removed from a well casing, mechanical cleaning and washing may not leave surface equipment clean enough to ensure that a completion fluid will not be contaminated by residual solids.

Prior clean-up operations, typically done during the displacement process, made use of various surfactants and/or solvents for removing drilling muds and cleaning drilling and wellbore equipment. U.S. Pat. Nos. 4,453,598 (Singer et al., Jun. 12, 1984); 4,474,240 (Oliver et al., Oct. 2, 1984); 4,528,102 (Oliver et al., Jul. 9, 1985); 4,588,445 (Oliver et al., May 13, 1986); and 4,592,425 (Oliver et al., Jun. 3, 1986) disclose processes for chemically cleaning drilling/completion/packer fluids.

U.S. Pat. Nos. 4,456,537 (Oliver et al., Jun. 26, 1984) and 4,515,699 (Oliver et al., May 7, 1985) disclose a process for cleaning muds and drilling systems using a surface active agent/surfactant and an alcohol. The combinations of alcohols and surfactants disclosed have a number of disadvantages when used with modern drilling systems, which use closed loop systems having reduced surface volume capacities of fluids available for displacement, cleanup and completion purposes. Therefore, to be effective, higher concentrations of an additive or compound for removing sludge, solids and drilling materials must be compatible with the fluid circulated to clean the wellbore. The alcohol and surfactant combinations disclosed cannot be used with fresh water or in high concentrations, as it will thicken the liquid phase, thereby reducing or eliminating its effectiveness in cleaning equipment and mud solids. Moreover, the preferred alcohol disclosed, 2-ethyl hexanol, has a flash point below 200° F., thereby causing it to be listed as a combustible liquid. The use of a combustible material in drilling operations is undesirable, particularly from a safety standpoint. The combinations are also less effective in removing synthetic base muds from drilling equipment and wellbores.

SUMMARY OF THE INVENTION

A chemical additive for cleaning a well drilling system and equipment by removing sludge, muds, mud solids, paraffin, and other well drilling residue solids from a well bore, well drilling system and surface drilling equipment is provided. The additive includes an alkene alcohol mixed with an ether amine and a base fluid or a mixture of both. The alkene alcohol and ether amine mixture can be 20%–75% to 10%–60% be weight, respectively. The base fluid is selected from the group of esters, diethers, olefins, detergent alkylates and mixtures thereof. The alkene alcohol can be about 20%–about 75% and base fluid mixture can be about 25%–about 80% by weight respectively. The mixture can be used undiluted or diluted with water, salt water or brine preferably in a 1% to 25% dilution by volume. The aqueous mixture is a dispersion of the chemical additive in water since the additive is not water soluble. Hereinafter reference to an aqueous mixture of the chemical additive and water whether or not it is a saline solution is a dispersion.

In the preferred embodiment of the chemical additive is a mixture of an alkene alcohol, ether amine and the base fluid. The alkene alcohol is present at from approximately 20% to 75% by weight of the additive. The alkene alcohol may be a terpene alcohol. The preferred alkene alcohol is terpinol. The ether amine is present at from approximately 10% to 60% by weight of the additive. The preferred ether amine is selected from the group consisting of ethoxylated ether amines, propoxylated ether amines, and mixtures thereof. The base fluid is present at from approximately 5% to 35% by weight of the additive. The base fluid is selected from the group consisting of esters, diethers, olefins, detergent alkylate and mixtures thereof.

A process for cleaning a well drilling system including drilling pits, surface equipment and the wellbore by removing sludge, muds, mud solids, paraffin and other well drilling residue solids from a well bore and well drilling system is provided. A chemical additive including an alkene alcohol and an ether amine or base fluid or combination of the two as described herein is prepared. The chemical additive is mixed with a desired volume of water to prepare an aqueous mixture, which is introduced to a well drilling system. The aqueous mixture is circulated throughout the well drilling system, thereby removing sludge, paraffin and other solids from the well bore, casing, and other well drilling system equipment.

The chemical additive used in the process of the present invention may be added to fresh water, sea water, or brine at from approximately 1% to 25% by volume of the aqueous mixture. In alternate processes, 26% by volume of the aqueous mixture up to 100% of chemical additive without water can be used to clean and remove solids from the drilling system.

DETAILED DESCRIPTION OF THE INVENTION

Well drilling fluids and well systems and equipment become contaminated with mud weighing agents, sludge, paraffin, drill bit fines, pipe dope, solids deposited on casings, and other drilling residues. It is preferred, and often necessary, that the well system be cleaned of used drilling fluids and mud solids, oils, and other drilling residues as part of the completion process. Before a wellbore is completed, the well system, tubing, casing, wellbore, wellhead, and flow lines must be cleaned. Once the solids and residues have been removed, a solids-free completion and/or packer brine can be introduced into the wellbore. After completion, it may be desirable to clean the well system.

The present invention provides a chemical additive and process for cleaning a wellbore and surface drilling equipment. In the preferred embodiment, the chemical additive is added to water to prepare an aqueous mixture which is a dispersion. Fresh water, seawater, or brine may be used to prepare the mixture of water and additive. The chemical additive removes contaminating solids as previously described, such as sludge, pipe dope, paraffin, mud solids, and solid drilling residues from wellbore, drilling equipment, and surface equipment. The chemical additive of the present invention can also be used to clean mud tanks, shakers, manifolds, and the like.

An additive of the present invention includes a mixture of an alkene alcohol in 20%–75% by weight and an ether amine in 10%–60% by weight. The additive mixture can be used in an aqueous mixture preferably from 1% to 25% by volume additive to water. The additive may be used undiluted or diluted at a strength of greater than 25% by volume.

Another additive is a mixture of an alkene alcohol and a base fluid selected from the group of esters, diethers, olefins, detergent alkylates and mixtures thereof. The alkene alcohol is present from about 20% to 75% by weight and the base fluid from 80% to 25% by weight with a preferred mixture of about 50/50 alkene alcohol to base fluid. The additive may be used undiluted or diluted with water, preferably at a strength of 1% to 25% by volume of additive to water.

The preferred chemical additive includes a surfactant preferably ethoxylated ether amine (at from approximately 10% to 60% by weight of the additive), an alkene alcohol (at from approximately 20% to 75% by weight of the additive), and a base fluid (at from approximately 5% to 35% by weight of the additive). Naturally occurring oils, such as low toxicity mineral oils, may be used, for the synthetic base fluid, however, such oils are subject to more stringent disposal and handling requirements than synthetic fluids. In an alternate embodiment of the chemical additive, a propoxylated ether amine may be used, at from approximately 10% to 60% by weight, for the ethoxylated ether amine. The chemical additive will be effective in cleaning and removing the remaining drilling muds, mud solids, sludge and other drilling residues from the wellbore and drilling equipment when comprising the recited compounds present in the ranges provided (percent by weight) of the total additive composition.

In the preferred process, the chemical additive will be added to water at from 1% to 25% by volume to form an aqueous mixture. The cleaning effects of the chemical additive will be seen where it is present in a water mixture at a minimum of 1% by volume, however, the length of time and volume of aqueous solution required to clean a drilling system will be decreased with the increased percent by volume of the chemical additive in the aqueous mixture. In other cases, 26% to 100% by volume of the chemical additive may be used to remove and lift the drilling solids and remaining muds from the wellbore and drilling equipment.

Ethoxylated or propoxylated ether amine is prepared by reacting primary alcohols having a branched or straight carbon chain from $C_6$ to $C_{22}$ with acrylonitrile to form an ether nitrile. The ether nitrile is then reacted with hydrogen in the presence of a catalyst to form an ether amine. The ether amine is then reacted with between 1 and 6 moles of ethylene or 1 to 10 moles of propylene oxide to form an ethoxylated or propoxylated ether amine. A reaction scheme of the described compounds to prepare the ether amine is as follows:

Alcohol Cyanoethylation

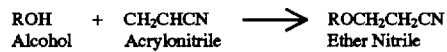

ROH     +    CH$_2$CHCN    ⟶    ROCH$_2$CH$_2$CN
Alcohol      Acrylonitrile         Ether Nitrile Ether Nitrile Reduction

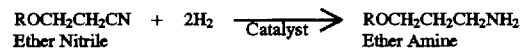

ROCH$_2$CH$_2$CN + 2H$_2$ →(Catalyst)→ ROCH$_2$CH$_2$CH$_2$NH$_2$
Ether Nitrile                              Ether Amine Ethoxylated Ether Amine ROCH$_2$CH$_2$CH$_2$NH$_2$ + (x+y)CH$_2$CH$_2$ ⟶
                                    \ /
                                     O
Ether Amine          Ethylene Oxide

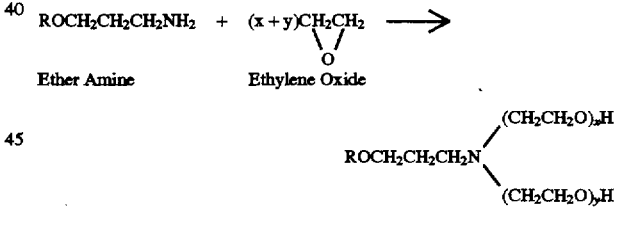

/(CH$_2$CH$_2$O)$_x$H
        ROCH$_2$CH$_2$CH$_2$N
                              \(CH$_2$CH$_2$O)$_y$H

Ethoxylated Ether Amine

The preparation of an amine from an alcohol provides lower viscosity due to the ether linkage. It can also have a lower specific gravity than conventional amine products. The alcohol may be branched as opposed to linear as with acids from fats. This is unlike the prior art, which discloses using surfactants which are the amine reaction products of monobasic fatty acids and secondary amines.

The alkene alcohol provides additional lifting action when coupled with the ethoxylated ether amine. Thus, the additive enables greater and longer lasting lift action of sludge or other solids in a brine or other water slurry. The alkene alcohols are also environmentally acceptable and biodegradable, and do not require regulated disposal practices.

In the preferred additive, the alkene alcohol is selected from the group of compounds known as terpenes. Terpene alcohols improve solvency of the additive and are water insoluble. The preferred terpene is terpinol. Other terpene related derivatives composed of carbon, hydrogen, and oxygen, and having 10 carbon atoms with 0, 1 or 2 hydroxyl groups, and 0, 1 or 2 double bonds, may be used in alternate embodiments. The hydroxyl group helps break the hydrogen bonding of sludge to metal surfaces. The terpene alcohols are effective in dispersion or emulsion systems, such as that created by the chemical additive of the present invention. The chemical additive breaks out of water and floats the solids after cleaning sludge, mud and other solids from the well drilling system. Thus, making it easy to recover, remove and dispose of the contaminants from the well system.

Blends of terpenes having the provided characteristics may also be used. Any terpene blend or terpene selected should have a flash point greater than 200° F. A commercially available terpene product having the desired characteristics is GLIDSOL 90 (SCM Glidco Organics, Montvale, N.J.). Also, a terpene alcohol blend, HOGSOL, has the desired flash point and is suitable. (SCM Glidco Organics, Montvale, N.J.).

The combination of the ether amine and the alkene alcohol will remove some of the sludges and solids from the well drilling system. Difficult to remove solids and residues such as pipe dope, however, will not be removed by the combination. The addition of a base fluid will facilitate removing and floating to the surface of the well bore all solids and contaminants remaining in the well bore as a result of the drilling process.

The base fluid is preferably a synthetic compound selected from the family of compounds introduced to the drilling industry in recent years. These synthetic compounds were developed in light of increasing environmental regulations toward traditional oil base drilling fluids or muds. The synthetic base fluid acts as a solvent in the chemical additive. The synthetic base fluid is selected as a co-solvent with the alkene alcohol. The base fluids are generally in the size range of $C_{18}$ to $C_{24}$, and may be selected from the following compounds: esters, diethers, olefins, and detergent alkylate, as well as mixtures of the fluids.

In the preferred chemical additive, an ester will be used as the base fluid. The ester can be made by the reaction of a fatty acid with an alcohol, and may be considered a synthetic vegetable oil. The ester can also be prepared by reacting light olefins through the hydroformylation (oxo) process to form alcohols. The alcohols are then reacted with acids to make esters. Commercially available esters which may be used to prepare the chemical additive include EXXATE 1000 (Exxon, Houston, Tex.) and EXXATE 1300 (Exxon, Houston, Tex.). Both products have a high flash point. EXXATE 1000 is an acetate ester using a $C_{9-11}$ branched alcohol (oxo-decyl-acetate), and EXXATE 1300 uses a $C_{13}$ alcohol.

Diethers made by the condensation and partial oxidation of alcohols; poly-alpha-olefin (PAO) (Ethyl Corp., Baton Rouge, La.), a straight chain non-aromatic hydrocarbon made by the polymerization of ethylene; and detergent alkylate (linear alkyl benzene LAB), composed of benzene having a saturated hydrocarbon attached, may be used in alternate embodiments. All the compounds are listed as nonhazardous and have flash points greater than 200° F. (Pensky Martin closed cup).

The following examples report the results of bench tests performed to determine the properties and efficacy of the present invention and its alternate embodiments. The examples are intended to be illustrative and not limit the present invention.

EXAMPLE 1

A test was conducted to compare the cleaning efficiency of various synthetic base fluids, 2-ethyl hexanol, low toxicity mineral oil (LTMO), and sea water to the preferred base fluid ester when removing American Petroleum Institute (API) pipe dope from steel. Pipe dope is difficult to remove from the steel of well drilling equipment. The preferred base fluid is EXXATE 1000, an ester compound. The other compounds provided in Table 1 have been used in the prior art as components of completion and other well drilling fluids.

Individual 400 ml beakers were filled with approximately 250 ml of the fluids to be evaluated. The fluids were held in turbulent flow using a magnetic stir bar. A separate pipe dope coated steel coupon was lowered into each flask of fluid and the cleaning efficiency measured. Each coupon was coated with approximately 3 grams of pipe dope at a thickness of approximately 3/32 inch. Cleaning efficiency was determined as a factor of the length of time to remove a percentage of the pipe dope from the steel coupon.

TABLE 1

| BASE FLUID (SOLVENT) | CLEANING EFFICIENCY %, TIME (min) | | |
|---|---|---|---|
| | 5 | 10 | 20 |
| 2-ethyl hexanol | 4 | 23 | 39 |
| EXXATE 1000 | 15 | 33 | 57 |
| EXXATE 1300 | 14 | 25 | 46 |
| WITCO 2307* (fatty acid ester) | 13 | 25 | 38 |
| LTMO | 24 | 69 | 93 |
| Sea water | 0 | 0 | 0 |
| PAO** | 7 | 17 | 40 |
| LAB | 23 | 53 | 73 |
| PETROFREE*** (fatty acid ester) | 5 | 14 | 36 |

*Witco, Houston, Texas
**Ethyl Corp., Baton Rouge, Texas
***Baroid, Houston, Texas The compounds tested are listed as base fluids on Table 1. Cleaning efficiency as a percent of pipe dope removed is shown for each fluid at 5, 10, and 15 minutes. The results reflect the solvent nature of the fluids.

The results show LTMO as having the highest cleaning efficiency. The disadvantage of using LTMO, however, is the required handling and disposal of an additive containing the compound. LTMO and products containing it cannot be dumped offshore. Thus, extensive handling and storage of the fluid or product containing the fluid would be required. Storage and handling capability is generally limited during a completion process, particularly in off-shore situations.

Linear alkylate benzene (LAB) had a relatively high cleaning efficiency of 73% following 15 minutes of exposure to the coupon. Although this is higher than that observed with EXXATE 1000 and EXXATE 1300, the use of LAB in well drilling clean up operations is undesirable and potentially dangerous because of the presence of low molecular weight aromatics.

EXXATE 1000 was found to be the preferred base fluid because of its cleaning efficiency and non hazardous and nonhealth threatening characteristics.

EXAMPLE 2

The ability of the chemical additive to agglomerate and float solids to the surface of the wellbore was simulated by laboratory bench test. Two samples containing a 0.5 gram sample of bentonite is dispersed in 100 ml of seawater were prepared. A 4 ml quantity of the chemical additive was added to one sample and a 4 ml quantity of a commercially available cleanup additive was added to the second sample. The additives were shaken into the bentonite solution and immediately placed in a 100 ml graduated beaker. The rise time, consistency and quality of the bentonite solids and overall appearance of the solids are reported in Table 2. The additive formulations are also shown in Table 2.

TABLE 2

| ADDITIVE | RISE TIME | SOLIDS REMOVED | APPEARANCE |
|---|---|---|---|
| A* | 1 min. | 6 ml | creamy solids |
| B** | 1 min. | 6 ml | creamy solids |

Additive formulations
A* = EXXATE 1000/GLIDSOL 90/Preferred Amine (25%/50%/25% by weight)
B** = 2-ethyl hexanol/WITCO 1017 (an amide) (50%/50% by weight)

The results of the ability of the present invention (A) compared to a commercially available cleaning additive (B) to agglomerate and float solids to the surface of the wellbore show both additives to have similar effectiveness in removing solids from a brine solution and lifting them to the surface of the solution. The results reported in Table 2 show that following one minute of rise time (period of time following shaking of the solution), 6 ml of solids were removed and floated to the surface of each sample. The samples appeared to be creamy and smooth, comprising agglomerated bentonite and other solids previously present in the sea water. Although the effectiveness of both additive formulations in removing and floating solids to the surface were relatively similar, Additive B is comprised of 50% by weight of an amide. Such compounds are disadvantageous for use in cleanup processes because only a small volume of the compound can be used in water. If too great a concentration of the compound is present in water, it may form a gel, thereby reducing the effectiveness of the compound as a cleanup additive. Thus, when using a formulation similar to B, large quantities of water must be used in order to maintain the low dilution factor for the amide. In cleanup situations where there are storage management concerns, the large volumes of water necessary for performing an adequate cleanup of the well drilling system will be difficult and possibly prohibitive. Considerably higher concentrations of Additive A, the chemical additive of this invention, can be used therefore reducing the volume of water and fluids which must be generated and handled and/or stored in order to perform an adequate cleanup of a wellbore and drilling equipment.

EXAMPLE 3

The effectiveness of alternate embodiments of the present invention are reported in Table 3. The samples were prepared following the protocol described in Example 2. The formulations for the alternate embodiments are provided in Table 3. All formulations of the chemical additive were similar with the exception of 25% by weight of the formulation comprising different synthetic base fluids. The terpene alcohol and preferred amine were constant in all formulations at 50% by weight and 25% by weight, respectively.

TABLE 3

| ADDITIVE | RISE TIME | SOLIDS REMOVED | APPEARANCE |
|---|---|---|---|
| C* | 1 min. | 6 ml | slightly gummy, creamy solids |
| D** | 1 min. | 6 ml | creamy solids |
| E*** | 1 min. | 6 ml | creamy solids |
| F**** | 1 min. | 5 ml | slightly gummy, creamy solids |

Additive formulations:
C* = WITCO 2307/GLIDSOL 90/Preferred Amine (25%/50%/25%) by weight)
D** = EXXATE 1300/GLIDSOL 90/Preferred Amine (25%/50%/25%) by weight)
E*** = LAB/GLIDSOL 90/preferred Amine (25%/50%/25%) by weight)
F**** = PAO/GLIDSOL 90/preferred Amine (25%/50%/25%) by weight)

Following a rise time of one minute, similar quantities of solids were removed and floated to the top of the brine solution with additives C, D, and F. Formulation F which contained the synthetic base fluid PAO, had a slightly lower volume of solids rise. The visible appearances of the agglomerated solids varied with formulation of the additive. Embodiments of the chemical additive containing WITCO 2307 (Witco, Houston, Tex.) and the formulation containing PAO as the synthetic base fluid resulted in the solids being slightly gummy.

EXAMPLE 4

The cleaning efficiency of the chemical additive of the invention compared to the that of the commercially available chemical additive described in Example 2 is reported in Table 4. The formulation of the additive identified on Table 4 as (A) is 50% by weight of 2-ethyl hexanol and 50% by weight of an amide (WITCO 1017). The composition of Additive (B) on Table 4 is the preferred embodiment of the invention of 25% by weight ester (EXXATE 1000), 50% by weight terpinol (GLIDSOL 90), and 25% by weight ethoxylated ether amine. The composition of additive (C) on Table 4 is 25% by weight amide (WITCO 2307), 50% by weight terpinol (GLIDSOL 90), and 25% by weight ethoxylated ether amine.

Steel coupons were coated with a diesel oil based drilling mud obtained from a field drilling site. The mud coated coupon was immersed into a 250 $CM^3$ volume of sea water containing the various concentrations of the chemical additives described above. The samples were held in turbulent flow using a magnetic stirrer while the coupon was in the fluid. The cleaning efficiency of the additives at the various concentrations provided as % in sea water, is reported in Table 4.

TABLE 4

| ADDITIVE, % in sea water | CLEANING EFFICIENCY %, TIME (min) | | |
|---|---|---|---|
| | 5 | 10 | 20 |
| 4% (A) | 5 | 8 | 15 |
| 10% (A) | 10 | 15 | 25 |
| 4% (B) | 10 | 15 | 30 |
| 10% (B) | 20 | 30 | 65 |
| 10% (C) | 80 | 95 | clean |

The results show that a mixture of 4% by volume of Additive A in sea water and a mixture of 10% by volume of Additive A in sea water had substantially lower cleaning efficiencies than the preferred embodiment of the chemical additive, identified as (B), and Additive (C) at each of the reported time intervals. The mixture of 10% by volume of formulation (C) in sea water was observed to have the highest cleaning efficiency percentage at all reported time intervals. The synthetic base fluid used in formulation (C), however, is not suited for use in large volumes in large scale cleanup operations because it must be heated and melted prior to it being used in an additive formulation. Moreover, solids lifted and separated using Additive (C) will be sticky and gummy, and therefore, difficult to handle and effectively recover from wellbore. Following 20 minutes of treatment by additive formulation (B) present at 10% by volume of the sea water mixture, a 65% cleaning efficiency was observed, or 65% of the mud was removed from the coupon. This percentage would likely be improved by increased exposure time or increased percentage of the chemical additive (B) in the water mixture.

EXAMPLE 5

The following example is illustrative of the product and process using a mixture of an alkene alcohol and base fluid. The alkene alcohol and base fluids are those previously described. The preferred alkene alcohol is a terpene, GLIDSOL 90. The preferred base fluid is a fatty acid ester. The range of mixture is 20%–75% alkene alcohol to 80%–25% base fluid by weight. The preferred mixture is 50/50 by weight alkene alcohol and base fluid. The additive may be diluted to 1%–25% by volume in water, sea water or brine.

The alkene alcohol and base fluid was tested in a simulated wellbore situation generally described in the preceding Example 2. A comparison was made of an additive of GLIDSOL 90 terpene and PETROFREE fatty acid ester in a 50%/50% by weight mixture and the additive designated A* which is made of EXXATE 1000/GLIDSOL 90/Preferred Amine in a 25%/50%/25% by weight mixture. Two types of bentonite were used; an aged regular bentonite and an aged high grade bentonite. The high grade bentonite is primarily sodium bentonite. The additives were used as 4% by volume dilution in sea water.

TABLE 5

| ADDITIVE | RISE TIME | SOLIDS REMOVED | APPEARANCE |
|---|---|---|---|
| BENTONITE - REGULAR | | | |
| A* | 2 min. | 6 ml | creamy solids |
| 50/50 | 2 min. | 4 ml | creamy |
| GLIDSOL 90/ PETROFREE | | | solids |
| BENTONITE - HIGH GRADE | | | |
| A* | 2 min. | 24 ml | creamy solids |
| 50/50 GLIDSOL 90/ PETROFREE | 5 min. | 24 ml | creamy solids |

The additive without the preferred amine did take longer for rise time and separation on the high grade bentonite, but performed satisfactorily in the tests.

The chemical additive of the present invention was used in a well with a build up of solids on the casing. The chemical additive was used in an 8–10% by volume in water. The chemical additive was the preferred formula A* described in Example 5 above. In the preferred process a HEDGEHOG® casing brush was used with the chemical additive to scour the inside of the casing. U.S. Pat. No. 5,419,397 covers some embodiments of the HEDGEHOG® and is incorporated by reference herein.

The solids were flushed from the casing. The fluid returning to the surface was a viscous liquid. The solid material returned to the surface was 83% paraffin oil with a melt point of 194° F., 13% low gravity solids (dirt, rust) and 4% water. A test on the paraffin showed that a ratio of 3/1 additive to paraffin reduced the melt point of the paraffin to below room temperature.

The process for using the chemical additive in the well system can be adapted for water base muds or oil base muds. A different series of steps for cleaning water base muds and oil base muds is preferred. The chemical additive is introduced into the wellbore after other fluids have been introduced or circulated through the well system. The additive causes the remaining drilling muds, mud solids, sludge, drilling residues adhering to the casing, walls of the wellbore, drill bit fines and other materials to be suspended in the additive aqueous mixture and floated to the top of the wellbore for removal. The solids can be removed decantation, floatation, filtration or other methods known to those skilled in the art. The chemical additive mixture can also be run through the surface equipment of the drilling system to remove drilling residues from the system, thereby ensuring that any fluid introduced to the wellbore as part of the completion process will be solids-free.

In the preferred process the hole capacity is determined and 1% by volume of the chemical additive compared to the hole capacity is used to clean out the wellbore. The additive is diluted with water or a salt solution to form an aqueous dispersion. A multi-phase displacement with a series of steps is used to remove the solids from the well system. A preferred series of steps for use with a water base mud includes first circulating water which can be seawater through the well system. This is followed by the chemical additive in an 8–10% by volume to water or aqueous salt solution. After the chemical additive, a viscous spacer such as a hyroxyethylcellulose solution was pumped throughout the system. Afterwards the desired completion fluids can be used.

A preferred process for removing oil base mud includes the following steps. A viscous spacer weighted with barite (or other weighting agents) that includes a water wetting surfactant agent is pumped into the well followed by a viscous unweighted spacer with a water wetting surfactant agent. Then 15 barrels of seawater or salt water is pumped through the well, followed by a solvent. After the solvent additional seawater is pumped. The chemical additive prepared as described herein is then introduced into the wellbore. Afterwards, it is preferred to use a viscous spacer with a water wetting surfactant followed by seawater or completion fluid.

The following is another preferred process of the use of the chemical additive in connection with an offshore rig cleanup operation after an SBM was used in the well. The hole capacity was 108 barrels and the drillpipe was 3100 feet. A mixture of hydroxyethylcellulose and a water wetting surfactant was pumped down the well. This mixture was followed by a salt solution prepared with calcium chloride. This salt solution may be followed by a solvent and another salt solution spacer. The chemical additive was the prepared in an 8% by volume calcium chloride in an aqueous solution with the chemical addition as approximately 1% by volume of the hole capacity. The circulation of the aqueous chemical additive solution is followed by a salt water spacer with calcium chloride.

In another rig clean up process with a hole capacity of 461 barrels after workstring displacement a similar process was utilized. The circulation of the salt water after the addition of the chemical additive was followed by an additional circulation of a fluid of a water wetting surfactant and another salt water spacer.

The chemical additive used in the wellbore clean up examples described above is EXXATE 1000/GLIDSOL 90 Preferred Amine (25%/50%/25% by weight). The water wetting surfactants and solvents used in the clean up process are known to those skilled in the art. Also, other process steps known in the art for wellbore cleanup may be included with additive.

It is apparent that there has been described herein a chemical additive and process for effectively removing sludge, muds, and other solids from a well drilling system. Various changes and alterations may be made in the practice of the chemical additive and method by those skilled in the art without departing from the spirit of this invention. It is intended that such changes be included within the scope of the appended claims. The present description is intended to be illustrative and not limit the present invention.

What is claimed is:

1. A process for cleaning well system equipment including drilling pits, surface equipment and wellbores comprising the steps of preparing a chemical additive of an ether amine and alkene alcohol;

mixing the additive with water; and introducing the aqueous mixture into the equipment to achieve cleaning of the equipment.

2. A process for cleaning well system equipment including drilling pits, surface equipment and wellbores of claim 1, wherein the ether amine is from approximately 10% to 60% by weight of the additive.

3. A process for cleaning well system equipment drilling pits, surface equipment and wellbores of claim 1, wherein the ether amine is selected from the group consisting of ethoxylated ether amines, propoxylated amines, and mixtures thereof.

4. A process for cleaning well system equipment including drilling pits, surface equipment and wellbores of claim 1, wherein the alkene alcohol is from approximately 20% to 75% by weight of the additive.

5. A process for cleaning well system equipment including drilling pits, surface equipment and wellbores of claim 1, wherein the alkene alcohol is terpene alcohol.

6. A process for cleaning well system equipment including drilling pits, surface equipment and wellbores of claim 1, wherein the alkene alcohol is terpinol.

7. A process for cleaning well system equipment including drilling pits, surface equipment and wellbores of claim 1, wherein the chemical additive is present at from about 1% to about 25% by volume in the aqueous mixture.

8. A process for cleaning well system equipment including drilling pits, surface equipment and wellbores of claim 1, wherein said aqueous mixture additionally comprises salt.

9. A process for cleaning well system equipment including drilling pits, surface equipment and wellbores comprising the steps of preparing a chemical additive of a base fluid selected from the group consisting of esters, diethers, olefins, detergent alkylate and mixtures thereof and alkene alcohol;

mixing the additive with water; and introducing the aqueous mixture into the equipment to achieve cleaning of the equipment.

10. A process for cleaning well system equipment including drilling pits, surface equipment and wellbores of claim 9, wherein the base fluid is from approximately 25% to 80% by weight of the additive.

11. A process for cleaning well system equipment including drilling pits, surface equipment and wellbores of claim 9, wherein the alkene alcohol is from approximately 20% to 75% by weight of the additive.

12. A process for cleaning well system equipment including drilling pits, surface equipment and wellbores of claim 9, wherein the alkene alcohol is terpene alcohol.

13. A process for cleaning well system equipment including drilling pits, surface equipment and wellbores of claim 9, wherein the alkene alcohol is terpinol.

14. A process for cleaning well system equipment including drilling pits, surface equipment and wellbores of claim 9, wherein the chemical additive is present at from about 1% to about 25% by volume in the aqueous mixture.

15. A process for cleaning well system equipment including drilling pits, surface equipment and wellbores of claim 9, wherein said aqueous mixture additionally comprises salt.

16. A process for cleaning well system equipment drilling pits, surface equipment and wellbores comprising the steps of preparing a chemical additive of an ether amine an alkene alcohol and a base fluid selected from the group consisting of esters, diethers, olefins, detergent alkylate and mixtures thereof;

mixing the additive with water; and introducing the aqueous mixture into the equipment to achieve cleaning of the equipment.

17. A process for cleaning well system equipment including drilling pits, surface equipment and wellbores of claim 16, wherein the ether amine is from approximately 10% to 60% by weight of the additive.

18. A process for cleaning well system equipment drilling pits, surface equipment and wellbores of claim 16, wherein the ether amine is selected from the group consisting of ethoxylated ether amines, propoxylated amines, and mixtures thereof.

19. A process for cleaning well system equipment including drilling pits, surface equipment and wellbores of claim 16, wherein the alkene alcohol is from approximately 20% to 75% by weight of the additive.

20. A process for cleaning well system equipment including drilling pits, surface equipment and wellbores of claim 16, wherein the alkene alcohol is terpene alcohol.

21. A process for cleaning well system equipment including drilling pits, surface equipment and wellbores of claim 16, wherein the alkene alcohol is terpinol.

22. A process for cleaning well system equipment including drilling pits, surface equipment and wellbores of claim 16, wherein the base fluid is from approximately 5% to approximately 35% by weight of the additive.

23. A process for cleaning well system equipment including drilling pits, surface equipment and wellbores of claim 16, wherein the chemical additive is present at from about 1% to about 25% by volume in the aqueous mixture.

24. A process for cleaning well system equipment including drilling pits, surface equipment and wellbores of claim 16, wherein said aqueous mixture additionally comprises salt.

25. A process for cleaning a wellbore comprising the steps of
 (a) preparing a chemical additive of an ether amine, an alkene alcohol and a base fluid selected from the group consisting of esters, diethers, olefins, detergent alkylate and mixtures thereof;
 (b) mixing the chemical additive with water to prepare an aqueous mixture as a dispersion;
 (c) circulating a viscous spacer through the wellbore;
 (d) circulating a salt water spacer after step (c);
 (e) circulating the chemical additive mixture in the wellbore after step (d); and
 (f) subsequent to step (e) circulating a fluid selected from the group consisting of a salt water spacer and a completion fluid.

26. A process for cleaning a wellbore of claim 25 additionally comprising the step of circulating a solvent prior to circulating the aqueous additive mixture.

27. A process of cleaning a wellbore of claim 25 wherein the ether amine is from approximately 10% to 60% by weight of the additive.

28. A process for cleaning a well bore of claim 25, wherein the ether amine is selected from the group consisting of ethoxylated ether amines, propoxylated amines, and mixtures thereof.

29. A process for cleaning a wellbores of claim 25, wherein the alkene alcohol is from approximately 20% to 75% by weight of the additive.

30. A process for cleaning a wellbore of claim 25, wherein the alkene alcohol is terpene alcohol.

31. A process for cleaning a wellbore of claim 25, wherein the alkene alcohol is terpinol.

32. A process for cleaning a wellbore of claim 25, wherein the base fluid is from approximately 5% to approximately 35% by weight of the additive.

33. A process for cleaning a wellbore of claim 25, wherein the chemical additive is present at from about 1% to about 25% by volume in the aqueous mixture.

34. A process for cleaning a wellbore of claim 25, wherein said aqueous mixture additionally comprises salt.

35. A process for cleaning a wellbore of claim 25, wherein said viscous spacer in step (c) addtionally comprises a water wetting surfactant.

36. A process for cleaning a wellbore of claim 25, wherein said viscous spacer in step (c) additionally comprises a weighting agent.

37. A process for cleaning a wellbore of claim 25, wherein the chemical additive used to prepare the mixture in step (b) is about 1% by volume of the wellbore capacity.

38. A process for cleaning a wellbore of claim 25 additionally comprising a step between step (e) and (f) of circulating a viscous spacer in the wellbore.

39. A process for cleaning a wellbore of claim 25 wherein the viscous spacer includes a water wetting surfactant.

40. A process for cleaning a wellbore comprising the steps of
 (a) preparing a chemical additive of an ether amine, an alkene alcohol and a base fluid selected from the group consisting of esters, diethers, olefins, detergent alkylate and mixtures thereof;
 (b) mixing the chemical additive with water to prepare a aqueous mixture;
 (c) circulating salt water through the wellbore;
 (d) circulating the aqueous mixture through the wellbore; and
 (e) circulating a viscous spacer through the wellbore.

41. A process of cleaning a wellbore of claim 40 comprising the additional step of after step (e) circulating a completion fluid.

42. A process of cleaning a wellbore of claim 40 wherein the ether amine is from approximately 10% to 60% by weight of the additive.

43. A process for cleaning a well bore of claim 40, wherein the ether amine is selected from the group consisting of ethoxylated ether amines, propoxylated amines, and mixtures thereof.

44. A process for cleaning a wellbores of claim 40, wherein the alkene alcohol is from approximately 20% to 75% by weight of the additive.

45. A process for cleaning a wellbore of claim 40, wherein the alkene alcohol is terpene alcohol.

46. A process for cleaning a wellbore of claim 40, wherein the alkene alcohol is terpinol.

47. A process for cleaning a wellbore of claim 40, wherein the base fluid is from approximately 5% to approximately 35% by weight of the additive.

48. A process for cleaning a wellbore of claim 40, wherein the chemical additive is present at from about 1% to about 25% by volume in the aqueous mixture.

49. A process for cleaning a wellbore of claim 40, wherein said aqueous mixture additionally comprises salt.

50. A process for cleaning a wellbore of claim 40, wherein said viscous spacer in step (e) additionally comprises a water wetting surfactant.

51. A process for cleaning a wellbore of claim wherein the chemical additive used to prepare the mixture in step (b) is about 1% by volume of the wellbore capacity.

* * * * *

UNITED STATES PATENT AND TRADEMARK OFFICE
CERTIFICATE OF CORRECTION

PATENT NO. : 5,678,631

DATED : October 21, 1997

INVENTOR(S) : Darrell P. Salisbury et al.

It is certified that error appears in the above-identified patent and that said Letters Patent is hereby corrected as shown below:

Column 14, line 55, Claim 51, please add --40-- after "claim".

Signed and Sealed this

Seventeenth Day of February, 1998

Attest:

BRUCE LEHMAN

Attesting Officer

Commissioner of Patents and Trademarks